US005903418A

United States Patent [19]

Boivin et al.

[11] Patent Number: 5,903,418

[45] Date of Patent: May 11, 1999

[54] OVERCURRENT PROTECTION APPARATUS FOR REFRIGERATION AND CONDITIONING COMPRESSOR SYSTEMS

[75] Inventors: Keith F. Boivin, South Attleboro; Hideharu Furukawa, Attleboro, both of Mass.; Radi Pejouhy, Wolfeboro, N.H.

[73] Assignee: Texas Instruments Incorporated, Dallas, Tex.

[21] Appl. No.: 09/028,722

[22] Filed: Feb. 24, 1998

[51] Int. Cl.[6] .................................................. H02H 7/00

[52] U.S. Cl. .............................. 361/22; 361/24; 361/103; 361/115

[58] Field of Search .................................. 361/22, 23, 24, 361/25, 93, 115, 103

[56] References Cited

U.S. PATENT DOCUMENTS

| | | | |
|---|---|---|---|
| 4,458,231 | 7/1984 | Senor | 337/107 |
| 4,490,988 | 1/1985 | Vogel | 361/104 |
| 4,791,329 | 12/1988 | Ubukata et al. | 310/68 |
| 5,015,985 | 5/1991 | Ubukata et al. | 337/368 |

OTHER PUBLICATIONS

Japanese Published Application No. 7–241061 dated Sep. 12, 1995 (No English Translation Available at this time).

*Primary Examiner*—Ronald W. Leja
*Assistant Examiner*—Stephen Jackson
*Attorney, Agent, or Firm*—Russell E. Baumann; Richard L. Donaldson

[57] ABSTRACT

Motor protection for air conditioning and refrigeration compressors includes in a first embodiment a cluster block (22) having a seat for a hermetic motor protector (24, 24') and mounting a combination terminal/fusible link **(26/26*d*, 26*d'*) in which the motor protector and combination terminal/fusible link can be exposed to cooling fluid contained in the compressor container and the cluster block is mounted on a lead-through pin (18*a*) of a header (18) in the container wall. In a second embodiment the cluster block (30) is mounted on all three pins (18*a*, 18*b*, 18*c*) of header (18) with pin connectors received in parallel extending channels (30*a*, 30*b*, 30*c*) of the cluster block. In another embodiment the cluster block (40) is irregular in configuration in order to accommodate available space in certain compressor containers and has a lid (40*g*) to enclose the motor protector. In another embodiment a base member (52) is tied directly to the stator winding and has a snap-on member (58) to capture the motor protector (24)** in the motor protector seat.

13 Claims, 12 Drawing Sheets

OVERCURRENT PROTECTION APPARATUS FOR REFRIGERATION AND CONDITIONING COMPRESSOR SYSTEMS

BACKGROUND OF THE INVENTION

This invention relates generally to electric motors and more particularly to the use of current and temperature responsive devices for deenergizing a motor in the event of fault conditions.

Hermetically sealed refrigerator and air conditioning compressor systems typically mount a compressor and an electrical motor for operating the compressor within a fluid-filled, hermetically sealed container. Lead-through pins extend through a wall of the container in sealed, electrically insulated relation to the wall and to each other to electrically connect the motor in an electrical circuit for operating the compressor. A motor protector is mounted inside the container to be thermally responsive to a rise in temperature of the motor as might result from the occurrence of a fault condition in the motor. Typically, the protector is also connected in the motor circuit in such a way that it is responsive to overcurrent conditions in the motor such as might result from such fault conditions to also interrupt operation of the motor for preventing overheating of the motor.

Motor protectors open the power circuit when either the motor temperature exceeds selected limits or when the motor draws excessive current, either from running overload or locked rotor conditions or a combination of the two conditions. In normal operation, the appliance in which compressors are used rarely experience a protector trip in which the power circuit is opened and the motor protector provides protection against motor failure and a possible fire from an overheated motor for the life of the appliance. Occasionally, due to some abnormal condition, the motor protector, which is automatically resettable, will periodically cycle. The fault condition, if left uncorrected, can eventually cause the motor protector to reach its useful life and fail. Failure is typically manifested by the electric contacts within the protector welding closed due to arcing and subsequent welding. When this happens, the branch circuit protection is relied on to interrupt the supply of power to the appliance. If, for some reason, the branch circuit protection does not open the circuit to the overheated appliance, a danger of fire or other catastrophic condition could occur. Eventual catastrophic failure occurs when the insulation between the motor windings and ground breaks down, due to high heat, and the windings short to ground or turn to turn shorts are formed resulting in a current surge of several hundred or more amperes. This can cause the failure of other components in the current path, such as the glass of a glass sealed, electrical feed through header. As a result, high pressure hot refrigerant gas and lubricating oil could be vented out of the compressor container. In order to prevent this from happening it is known to provide a fusible link placed inside the hermetic motor protector connected in series with the contacts. The link is designed to melt and permanently open the circuit when the current going to the motor exceeds every condition prior to a short circuit to ground, typically the burn-out current is some 25 percent higher than the worst case of normal locked rotor current and is continuous, not intermittent due to the protector cycling.

However, in this approach the thermostatic disc inside the protector must be formed with a higher operating temperature than for comparable thermostatic discs in protectors that do not also contain a fusible link to compensate for the heat generated by the fusible link. The higher stresses required to form a thermostatic snap acting disc with a higher operating temperature can lead to shorter life expectancy of the disc. Due to the higher temperature at which the disc must be calibrated, the thermostatic metal can fatigue and go into creep action with subsequent welding of the contacts. This is particularly true, for example, where momentary power interruptions occur during compressor operation which can result in locked rotor conditions.

SUMMARY OF THE INVENTION

It is therefore an object of the invention to provide protection apparatus for air conditioning and refrigeration compressors which overcomes the above noted prior art limitations. Another object of the invention is to provide apparatus for protecting such compressors which is compact in size and one which can be installed in a compressor with minimal labor. Yet another object of the invention is the provision of improved apparatus which is easily connected to the lead-through pins of a compressor which will provide protection for the compressor motor from overcurrent and overtemperature conditions as well as to permanently disable the power circuit in the event of failure of the motor protector in which the motor protector is not de-rated (i.e., a protector in which the disc has a conventional, normal operating temperature).

Briefly, in accordance with a first embodiment of the invention, motor protection apparatus for an air conditioning and refrigeration compressor motor comprises a cluster block mounting a motor protector and a combination terminal/fusible link member mounted exteriorly of the motor protector. The cluster block is mounted on the common lead-through pin of a header mounted in the wall of the compressor container. Another motor protector terminal and the motor winding terminals are connected to the electrical circuit of the compressor motor using quick connects for convenient installation. The fusible link portion of the combination terminal/fusible link member is composed of selected materials such as beryllium copper for use in opening the motor circuit upon shorting to ground or zinc for opening the circuit prior to shorting to ground. According to a feature of the invention, several particularly efficacious configurations for the fusible link provide an extended length fuse link portion without increasing the package size of the protector apparatus. According to another embodiment of the invention, the cluster block is adapted to be received on all three header pins. According to a feature of this embodiment, a plurality of parallel extending channels receive pin connectors in opposite directions with the pin receiving apertures in the cluster block then receiving the lead-through header pins. According to another feature of the invention, a special bracket having a spade terminal blade is received in one parallel channel and a portion is welded to the pin terminal of the motor protector utilizing a welding access window in the wall of the cluster block. In order to prevent excessive forces from being applied to the motor protector pin terminal upon removal of a quick connect from the spade terminal blade, a tab extends from the bracket through an aperture in a wall of the cluster block and is staked in place. Additional retention can be obtained by the provision of outwardly extending spring barbs formed on the bracket adjacent to the spade terminal blade and lockably received in recesses formed in the cluster block walls. The combination terminal/fusible link is welded to the housing of the motor protector and extends through one of the parallel extending channels to the common lead-through pin. According to an optional feature of the invention, the motor protector has a header mounting a terminal pin in electrically insulated relation to the motor protector housing in which the header can be formed with a generally rectangular feature to aid in alignment of the motor protector when assembling to the cluster block assembly. Another embodiment comprises a cluster block which encloses the motor protector and combination terminal/fusible link. The cluster block has an irregular configuration to accommodate space requirements in certain compressor containers. Still another embodiment shows a two part snap assembly member for mounting the motor protector and combination terminal/fusible link for tying directly to the stator winding of the compressor motor.

BRIEF DESCRIPTION OF THE DRAWINGS

Other objects, advantages and details of the compressor system protection apparatus appear in the following detailed description of the preferred embodiments of the invention, the detailed description referring to the drawings in which:

FIG. 8*f* is a simplified view similar to FIG. 8*b* showing a modification of terminal 32 and FIG. 8*e* is a side view of the FIG. 8*f* terminal;

Figure 1:
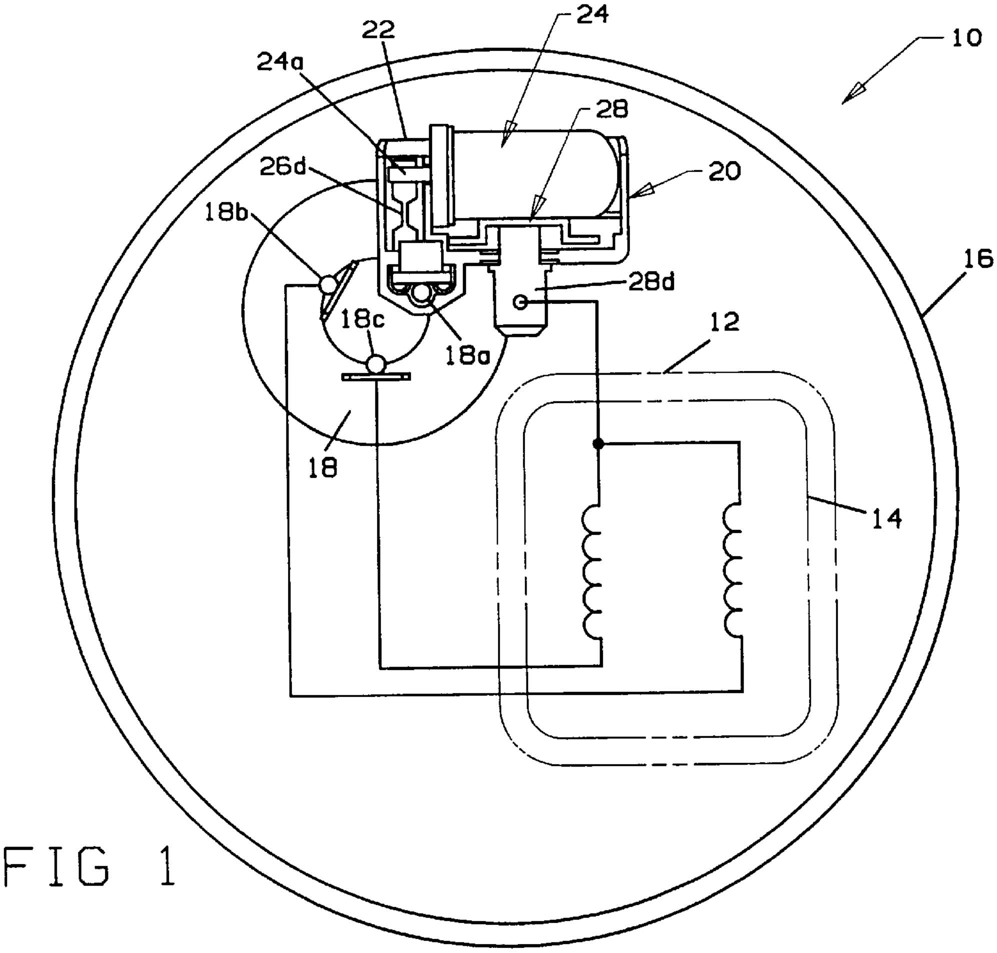
FIG. 1 is a schematic top plan view of a compressor system made in accordance with a first embodiment of the invention.
Figure 2:
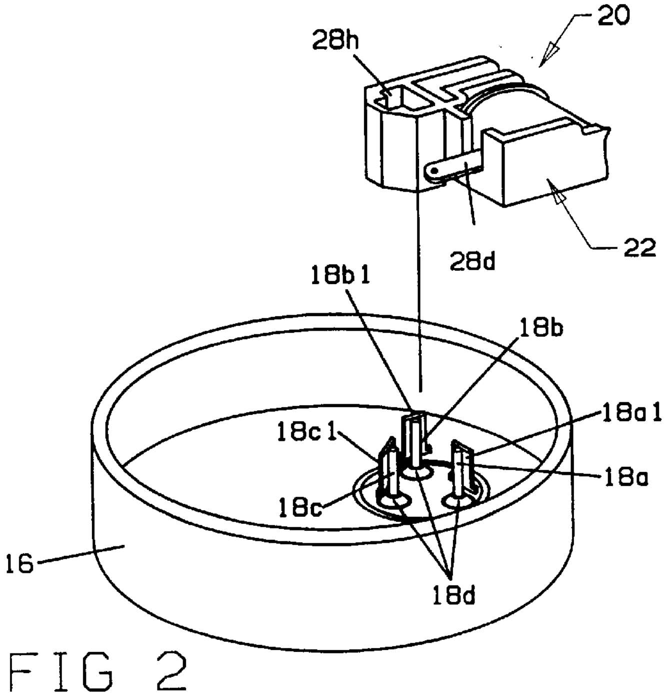
FIG. 2 is a perspective view of the bottom of the top portion of a compressor container shown with the protector apparatus aligned with header lead-through pin 18*a* prior to mounting thereon.

Dimensions of certain of the parts as shown in the drawings may have been modified to illustrate the invention more clearly.

Corresponding reference characters indicate corresponding parts throughout the views of the drawings.

DETAILED DESCRIPTION OF PREFERRED EMBODIMENTS

Referring to FIG. 1 of the drawings, numeral 10 is used to generally indicate the novel and improved compressor system of this invention which is shown to include a compressor 12 used for refrigerator and/or air conditioning systems and an electric motor 14 for operating the compressor which are mounted within a hermetically sealed container 16. Coolant fluid is received in container 16 surrounding the compressor and motor and a plurality of electrically conductive lead-through pins 18*a,* 18*b,* 18*c* extend through a wall of container 16 in spaced, electrically insulated relation to the wall and to each other for electrically connecting the motor in an electrical circuit.

In accordance with the invention, compressor 12 is of a conventional rotary type arranged to be operated by a conventional electrical motor disposed within the sealed container in a conventional manner. Preferably, the lead-through pins 18*a,* 18*b,* 18*c* are mounted in a conventional header 18 having the pins secured in openings in the header in sealed, electrically insulated relation to the header and to each other by glass sealing means, header 18 being welded to the wall of container 16 in conventional manner.

In accordance with a first embodiment of the invention, a novel and improved motor protection unit is mounted within container 16 on the inner end of lead-through pin 18*a* and is electrically connected in the electrical circuit of motor 14 to be thermally responsive to changes in the temperature within container 16 as well as overload currents of the motor for protecting the motor against overheating while also facilitating easy, economical and reliable assembly of the compressor system.

With particular reference to FIGS. 1–4, the motor protection unit 20 of the first embodiment comprises a cluster block 22 formed of suitable electrically insulative material such as a moldable thermoplastic having sidewalls 22*a,* 22*b* and 22*c* extending in planes generally parallel to one another, back wall 22*d* and bottom wall 22*e.* In accordance with the invention, a thermal and current responsive motor protector 24 of any conventional type such as the thermal and current responsive protector shown in U.S. Pat. No. 4,485,231 is mounted on cluster block 22 so that the motor protector is easily connected in the electrical circuit of motor 14 in much the same manner as disclosed in Japanese Patent Application No. 141211/86, assigned to the assignee of the present invention. The motor protector is exposed to refrigeration fluids at the open top and front of the cluster block. Motor protector 24 is cradled between sidewalls 22*a,* 22*b* with the terminal pin 24*a* received in a cut out 22*f* with inclined lug surfaces 22*n* and 22*o* formed in bottom wall 22*e* to stabilize the motor protector. Terminal pin 24*a* is welded to tab 26*a* of terminal 26 which comprises a female quick connect portion 26*b,* an offset portion 26*c* and a fuse portion 26*d.* Terminal 26 is received in cluster block 22 with quick connect portion 26*b* received in pin aperture 22*h,* offset portion 26*c* in cut out 22*j* and fuse link portion 26*d* disposed between sidewall sections 22*b,* 22*c.* Quick connect portion 26*b* is formed to receive spade type blade terminal 18*a*1.

Terminal 28 comprises a generally U-shaped bracket 28*a* having a weld tab portion 28*b* at the bight of the U-shaped bracket for welding to the electrically conductive housing 24*b* of motor protector 24 and arms 24*c* extending downwardly from the respective distal ends of the legs of the U-shaped bracket which are received in apertures 22*k* of each of two bosses 22*l* and staked therein. A spade terminal blade 28*d* extends outwardly from weld tab 28*b* through a slot 22*m* in back wall 22*d*.

Figure 3:
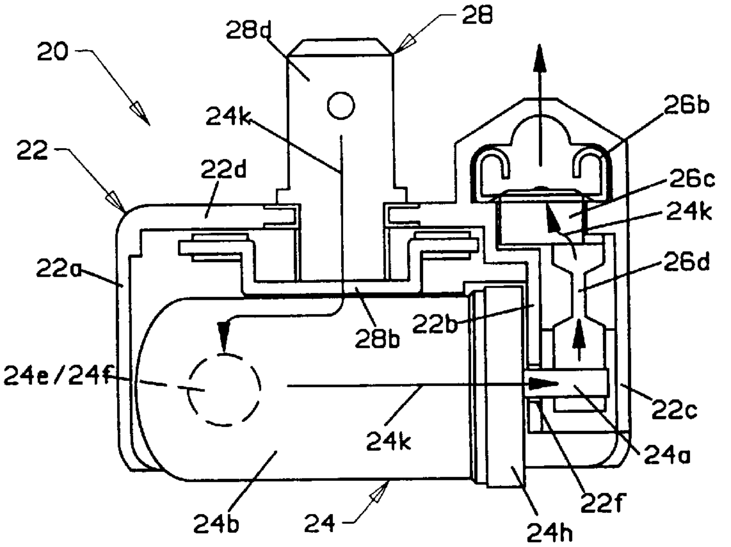
FIG. 3 is a top view of the protector apparatus shown in FIG. 2.
Figure 3B:
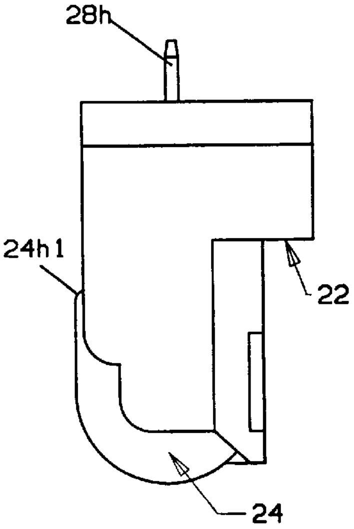
FIG. 3*b* is a right side view of FIG. 3.
Figure 3A:
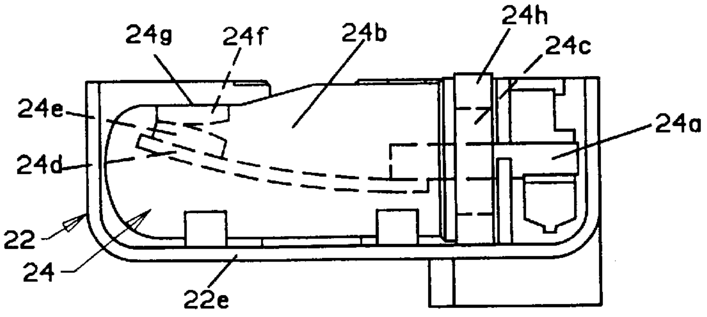
FIG. 3*a* is a front view of FIG. 3
Figure 4:
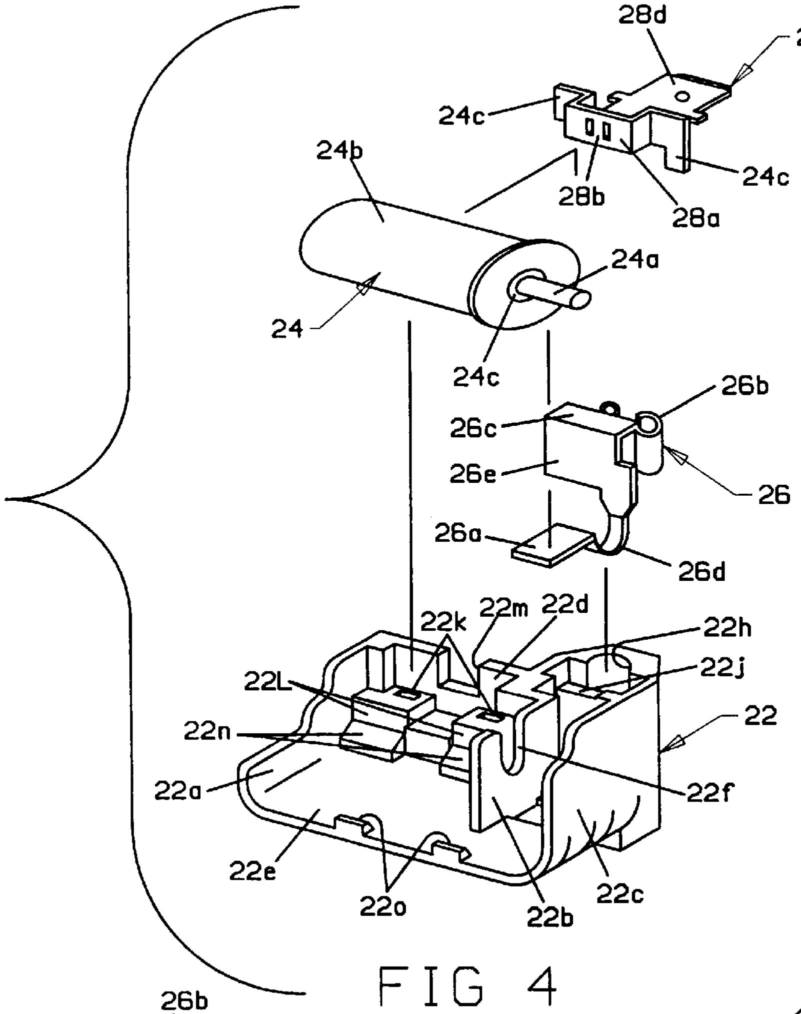
FIG. 4 is a blown apart perspective of the protector apparatus of FIG. 3.

As shown in FIGS. 3 and 3*a* in dashed lines, motor protector 24 has a snap acting, current carrying thermostatic disc 24*d* attached to terminal pin 24*a* with a movable electrical contact 24*e* mounted on a free distal end arranged to move into and out of engagement with stationary contact 24*f* mounted on a flattened portion 24*g* of housing 24*b*. Terminal pin 24*a* is electrically separated from header 24*h* by suitable dielectric material such as glass 24*c*. Preferably, motor protector 24 is modified by forming the header with a rounded off generally rectangular corner 24*h*1 which serves to facilitate placement of the motor protector into cluster block 22 in a desired orientation relative to its longitudinal axis. This provision also aids in ensuring the proper angular orientation of the header and disc mounted thereon relative to the stationary contact of the motor protector.

As seen by arrows 24*k* in FIG. 3, current flows from the motor windings through spade terminal 28*d* via a quick connect terminal, not shown, through housing 24*b*, the electrical contacts 24*f*, 24*e*, thermostatic disc 24*d*, terminal pin 24*a*, fuse link portion 26*d*, quick connect portion 26*b* to common lead-through pin 18*a*. Lead-through pins 18*b* and 18*c*, as shown in FIG. 1 are connected to the respective windings of motor 14.

Figure 5:
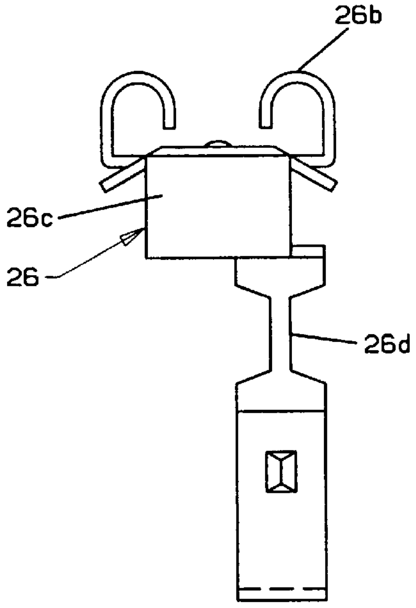
FIG. 5 is a top view of a combination terminal and fuse link of the FIG. 3 protector apparatus.
Figure 5A:
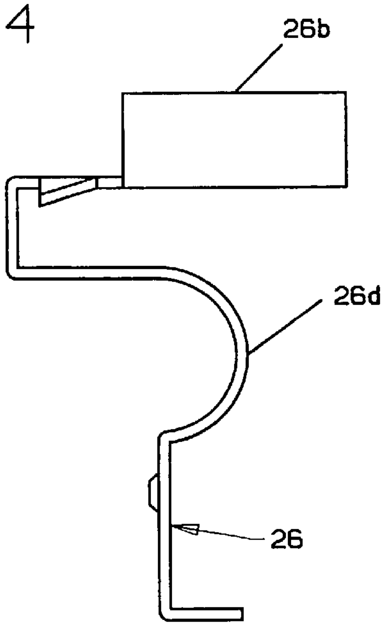
FIG. 5*a* is a right side elevational view of FIG. 5, FIG. 5*b,* is a top view of a modified combination terminal and fuse link.

When the thermostatic disc is heated and reaches a predetermined, calibrated temperature level it will snap from the position shown in dashed lines in FIG. 3 to an oppositely dished configuration (not shown) with the contacts 24*e*, 24*f* out of engagement with one another to interrupt power to compressor motor 14. Upon lowering of the thermostatic disc temperature to a calibrated lower, reset value the disc will snap back into contacts engaged position to reenergize the motor. If for any reason motor protector fails as by having contacts 24*e*, 24*f* weld together through excessive arcing or the like, and a fault occurs in the motor, such as a locked rotor condition, fuse link portion 26*d* is selected to burn out before glass 18*d* of header 18 fractures. Fuse link portion 26*d* is formed of suitable material such as beryllium copper having a selected electrical conductivity with a narrowed or necked down portion to increase the electrical resistance to a selected value so that the fusible link will burn out in accordance with selected time vs. current curves, known in the industry. According to one embodiment, as shown in FIGS. 5 and 5*a*, fuse link portion 26*d* has a narrowed center portion having a selected thickness and conductivity so that it will carry normal current loads, e.g., 50 amperes, without generating significant heat but will generate sufficient heat so that it will melt the narrowed portion based on a selected time vs. current curve. Typically, this occurs after a failure of the motor protector, e.g., at a time beyond its life expectancy, with the contacts fused together and after the winding insulation has broken down with the current being shorted to ground. This high current causes the fuse to burn out and interrupt current flow before pressure and temperature increase within the container resulting in failure of the glass material in the header. As shown in FIGS. 5 and 5*a*, fusible link 26*d* is necked down in the plane shown in FIG. 5*a* and curved as projected in the plane shown in FIG. 5*a* to provide a longer effective length without enlarging the package size of cluster block 22. Maintaining a small, compact package is essential in order to fit it within the very limited space available in the compressor container.

Figure 5B:
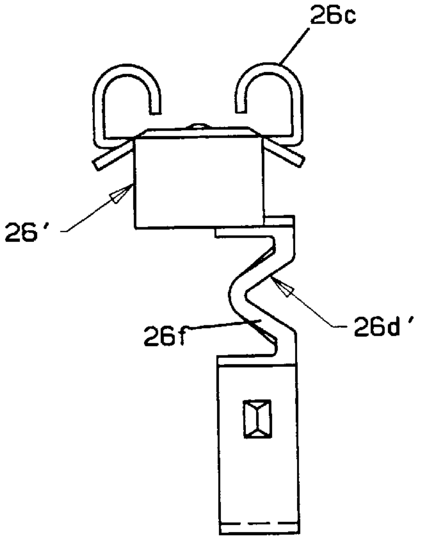
FIG. 5*c* is a right side elevational view of FIG. 5*b;*
Figure 5C:
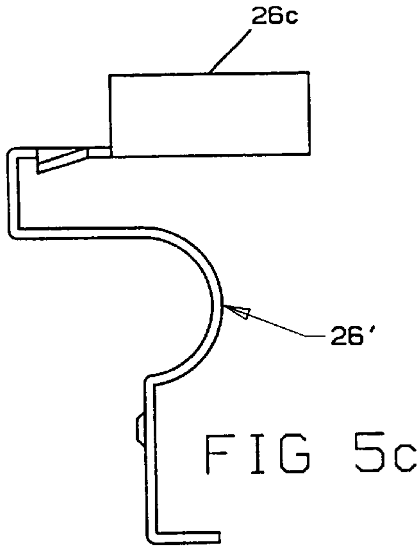

An even more effective fusible link is shown in FIGS. 5*b* and 5*c* in which the center portion of fusible link 26*d'* is also curved in the plane shown in FIG. 5*c* and as projected in the plane shown in FIG. 5*b*, generally normal to the FIG. 5*c* plane, is necked down as well as being deformed into a generally V-shaped configuration at 26*f* to obtain a still longer effective length without increasing the package size.

It will be realized that combination terminal 26 and fusible link can be formed integrally, as shown in the drawings or, if desired, can be comprised of separate members welded together. Further, fusible link 26*d* can be selected so that the link will open and interrupt current flow before shorting to ground occurs. For example, by using zinc which has a lower melting point than beryllium copper as the material for the fusible link portion and also has a relatively high positive temperature coefficient of resistivity. As the temperature of the material increases the electrical resistance also increases so that the link can be conveniently selected to burn out at a point beyond the time and current associated with so-called tack welds which typically open in a matter of seconds yet will burn out before the motor shorts to ground.

As noted supra, it is known to include a fusible link within the confines of a hermetically sealed motor protector. By doing so, the heat generated by the fusible link during normal operating conditions and during conditions which are of a temporary overload nature must be compensated for in calibrating the thermostatic disc element by selecting a higher operating (opening) temperature. This involves higher stress levels in the disc element resulting in an earlier fatigue and a shorter life of the disc. By placing the fuse link external to motor protector 24 this de-rating not only is avoided but the fuse link is directly exposed to refrigerant fluids which will keep the link at a lower temperature during normal and temporary fault conditions and thereby help avoid potential nuisance tripping.

Another advantage provided by the invention relates to the assembly of the cluster block and electrical connection to compressor motor 14 which is greatly facilitated by being able to merely push the cluster block onto common header pin 18*a* and then connect conventional quick connect female connectors (not shown) from the motor to spade terminal 28*d* and the spade terminals attached to pins 18*b* and 18*c*.

Figure 6:
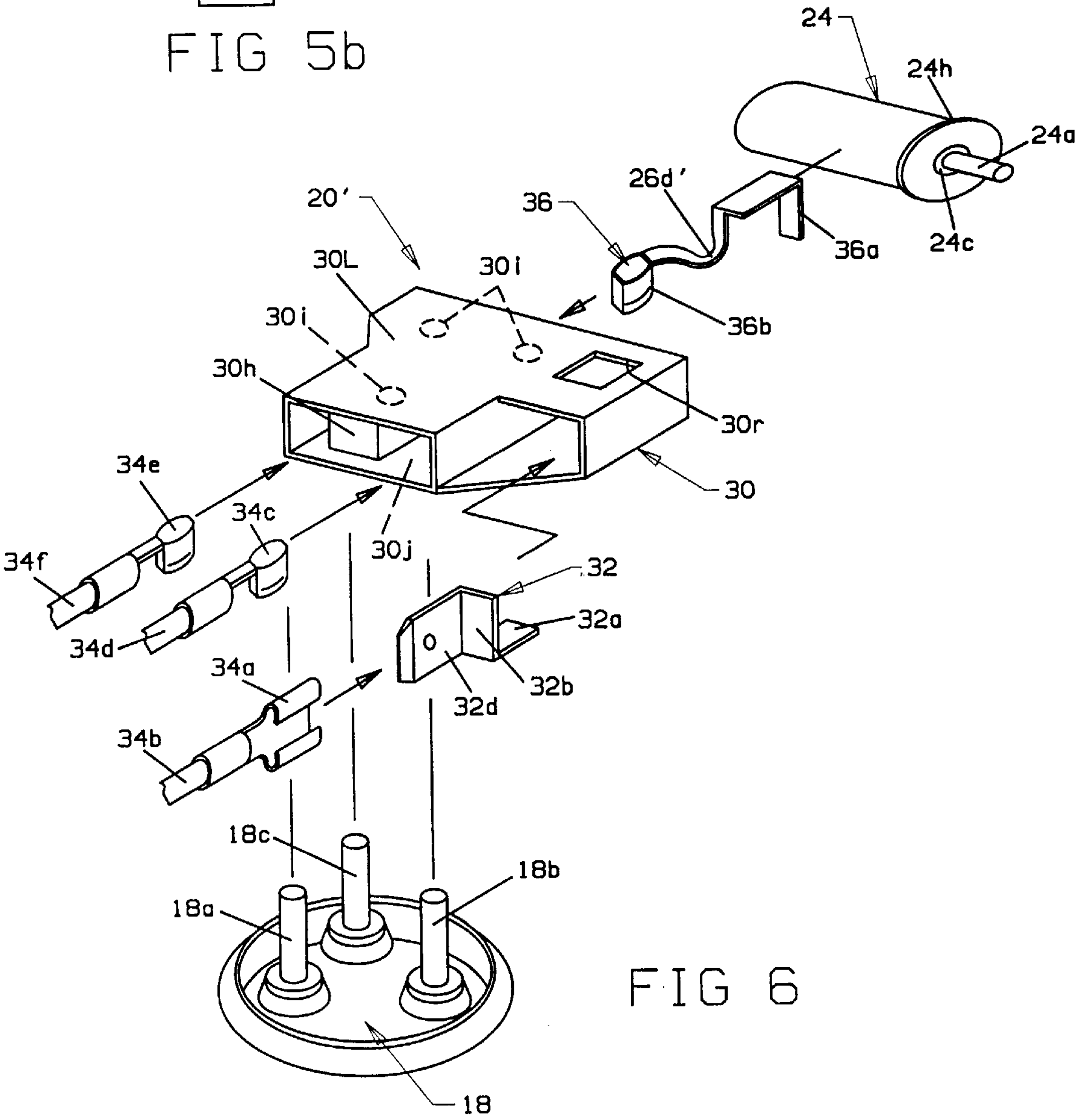
FIG. 6 is a blown apart perspective of protector apparatus made in accordance with another embodiment of the invention and compressor system header.
Figure 7:
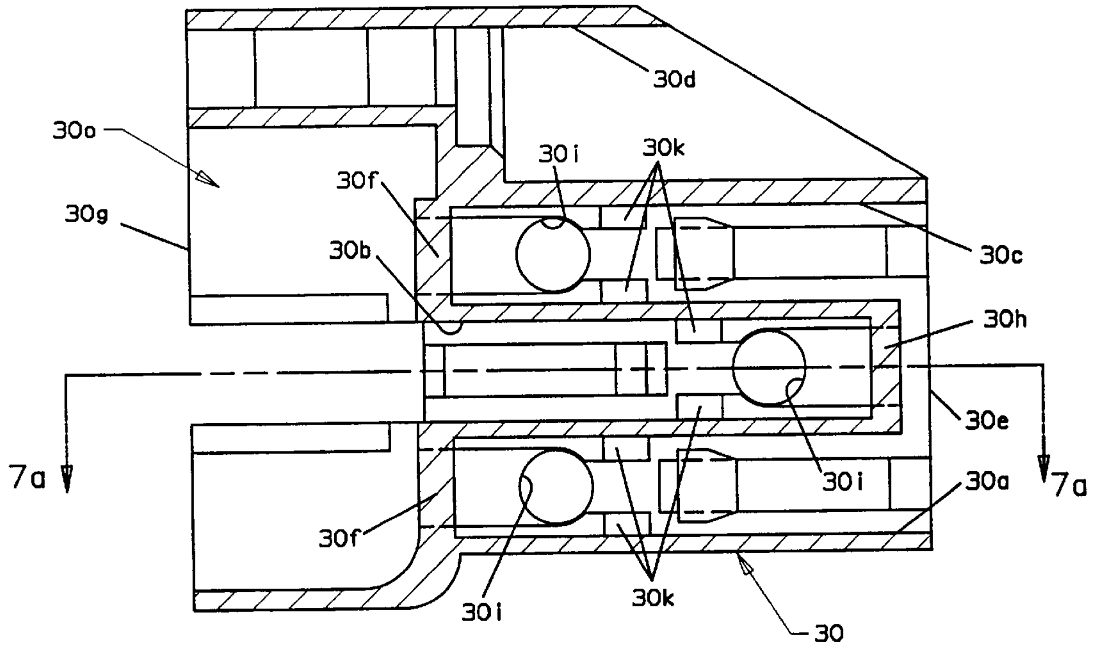
FIG. 7 is a cross sectional view taken through the FIG. 6 cluster block and FIG. 7*a* is a cross sectional view taken on line 7*a*—7*a* of FIG. 7.
Figure 7A:
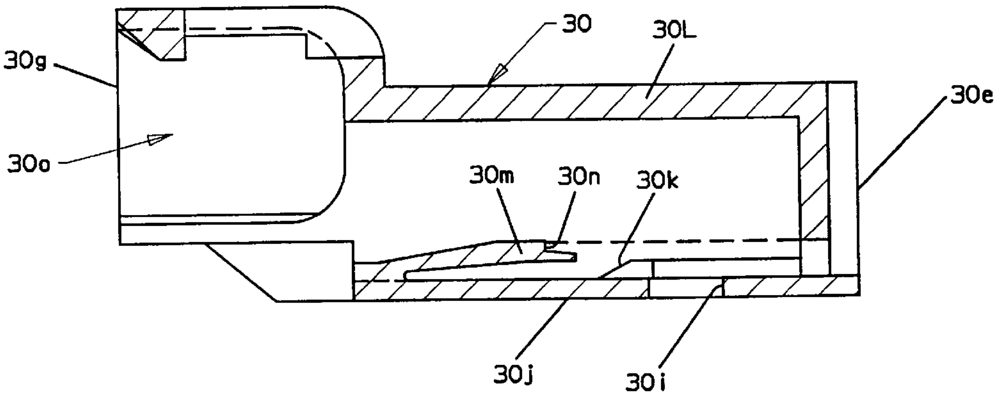
Figure 8:
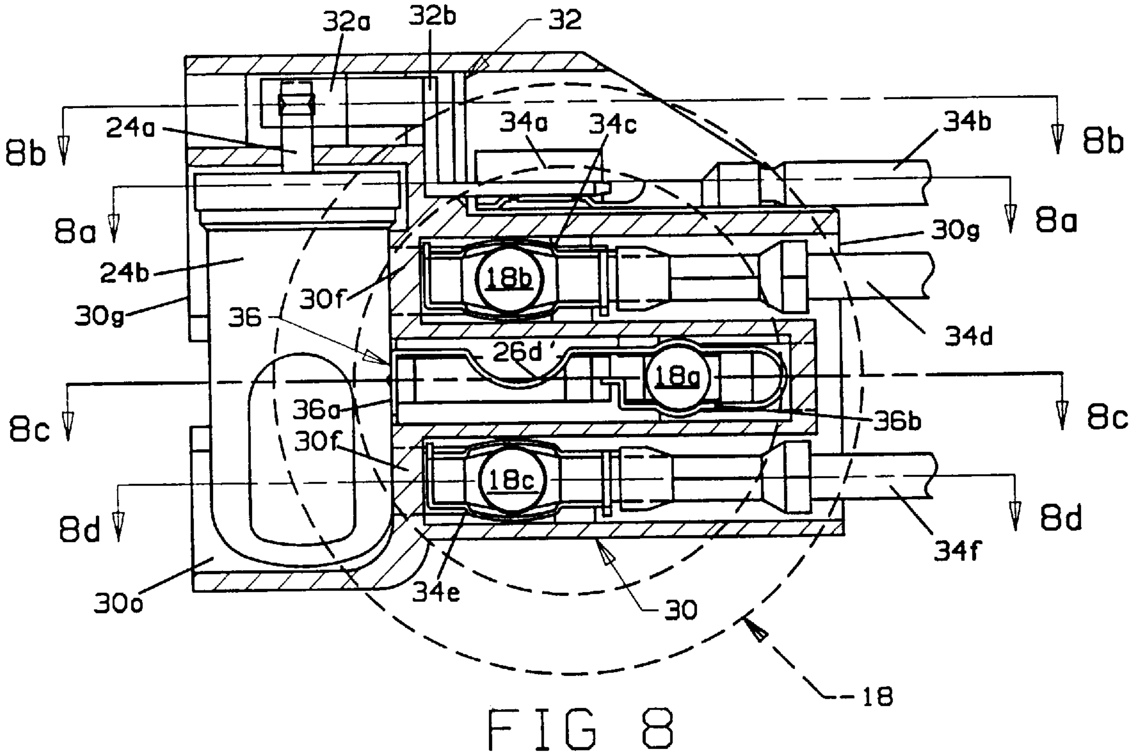
FIG. 8 is a cross sectional application, similar to FIG. 7 but showing connectors, terminals and a motor protector mounted in the cluster block.
Figure 8A:
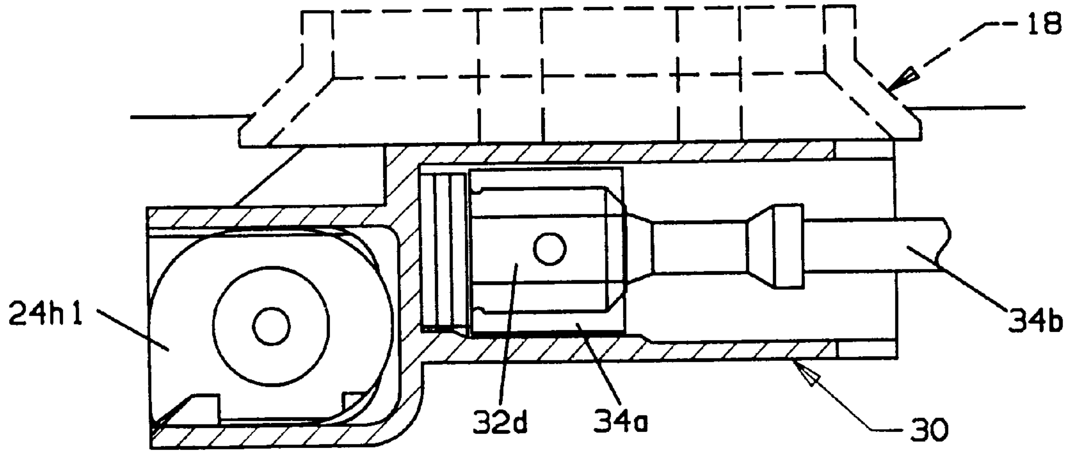
FIG. 8*a* is a cross sectional view taken on line 8*a*—8*a* of FIG. 8.
Figure 8B:
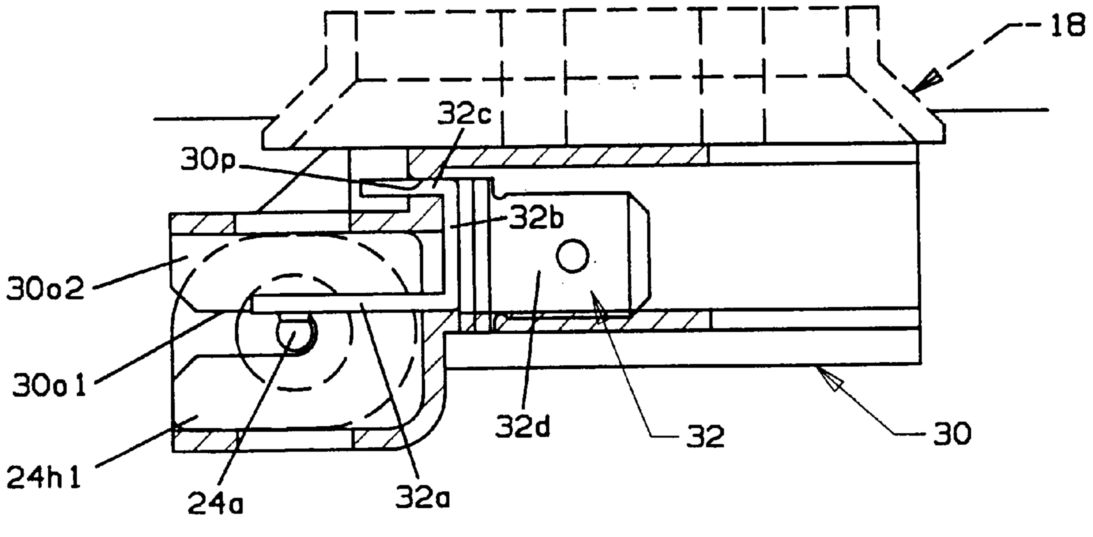
FIG. 8*b* is a cross sectional view taken on line 8*b*—8*b* of FIG. 8.
Figure 8C:
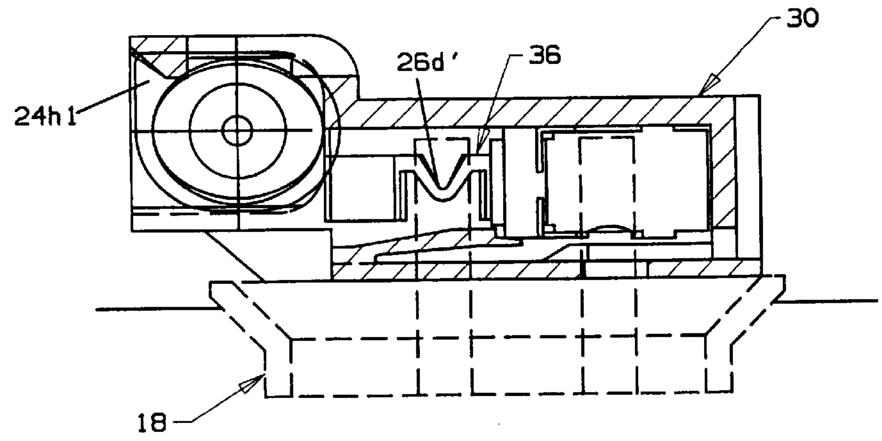
FIG. 8*c* is a cross sectional view taken on line 8*c*—8*c* of FIG. 8.
Figure 8D:
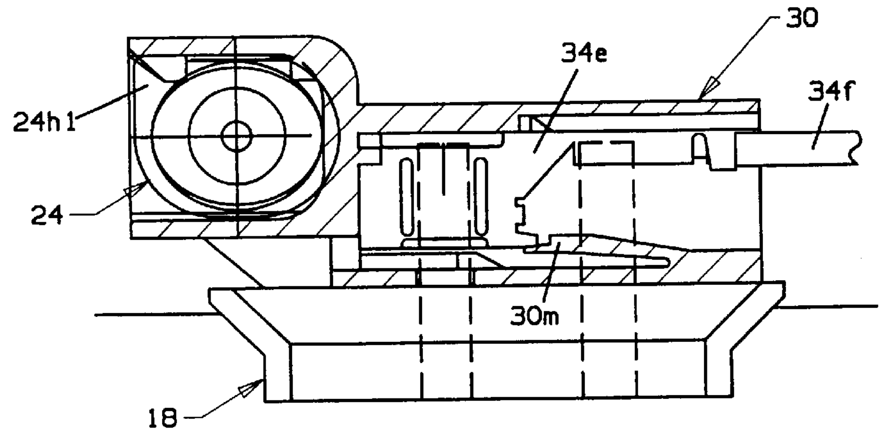
FIG. 8*d* is a cross sectional view taken on line 8*d*—8*d* of FIG. 8.
Figure 8E:
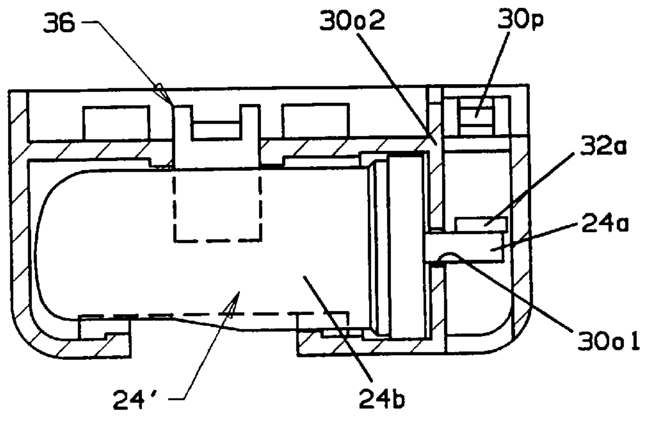
FIG. 8*e* is a top view of the FIG. 8 protector apparatus.
Figure 8F:
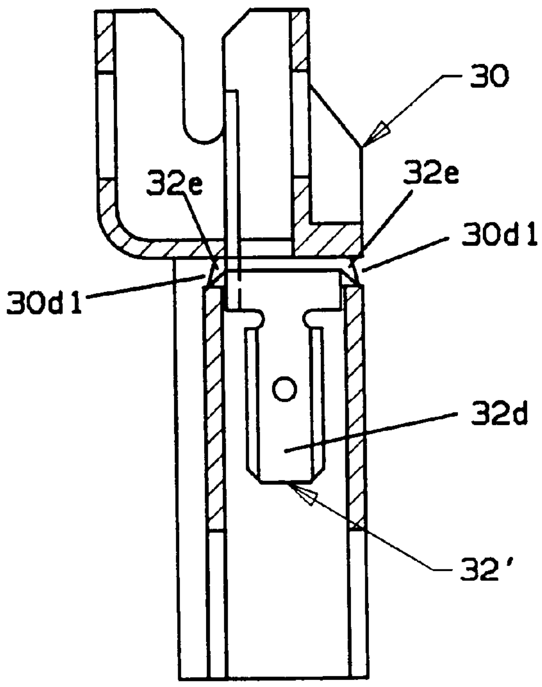
Figure 8G:
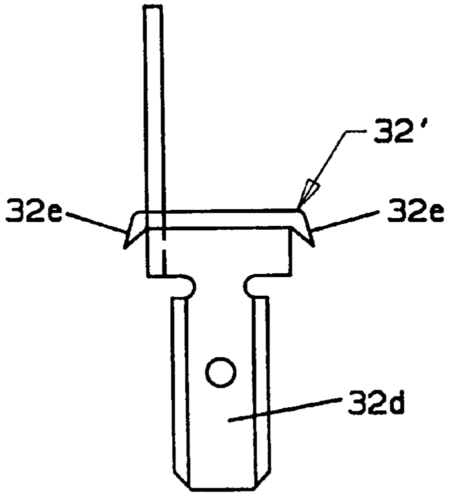

Another embodiment is shown in FIGS. 6–8 in which cluster block 30 of motor protector unit 20' is adapted to be received on all three header lead-through pins 18*a*, 18*b* and 18*c*. With particular reference to FIGS. 7 and 7*a*, cluster block 30 is formed of suitable electrically insulative, moldable material such as a thermoplastic and has three parallel extending pin connector receiving channels 30*a*, 30*b* and 30*c*. Another parallel extending connector receiving channel 30*d* is formed adjacent to channel 30*c*. Channels 30*a* and 30*c* respectively have an open end facing edge 30*e* and an opposed closed end 30*f* while channel 30*b* has a reverse orientation having an open end facing edge 30*g* and an opposed closed end 30*h*. A respective lead-through pin receiving aperture 30*i* is formed through bottom wall 30*j* in alignment with each of channels 30*a*, 30*b* and 30*c*. Cam surfaces 30*k* are formed in each of the channels on either side of apertures 30*i* to direct the pin connectors to be received in the channels toward the upper wall 30*l*. A spring leaf 30_m_ extends in cantilever fashion from the inside of wall 30_j_ at a location near the open end back to a free distal end with a shoulder 30_n_ to lock in the pin connectors once inserted in the channel.

Channel 30_d_ is open at both ends and is adapted to receive terminal 32 best seen in FIGS. 8 and 8_b,_ to be discussed below. A motor protector seat 30_o_ is formed in cluster block 30 which is open at edge 30_g_ for reception of a suitable motor protector such as the one shown in the FIGS. 1–6 embodiment. As shown, motor protector 24' is generally elliptical in a cross section taken perpendicular to the axis of terminal pin 24_a_ so that the size of the motor protector taken in the direction of the axis of the lead-through pins in minimized and has a header 24_h_ having a generally rectangular orienting feature 24_h_1 as discussed above. Terminal 32 received in channel 30_d_ has a weld tab 32_a_ which is welded to terminal pin 24_a_ of protector 24', an aperture 30_r_ being provided in wall 30_l_ of cluster block 30 to facilitate the welding step, an offset portion 32_b_ formed with a retention tab 32_c_ (see FIG. 8_b_) which is received through an aperture 30_p_ in a wall portion of cluster block 30. A spade terminal 32_d_ extends downwardly, as seen in FIGS. 8_a,_ 8_b,_ into channel 30_d_ for reception of a female quick connect member 34_a_ of common lead 34_b_ of motor 14. If desired, terminal 32_d_ can be formed, relative to edge 30_g,_ with outwardly and downwardly extending spring barbs 32_e,_ as seen in FIG. 8_g_. This can serve as a positive retention feature receivable in recesses 30_d_1, FIG. 8_d,_ of the walls forming channel 30_d_ to ensure that upon removal of female connector 34_a_ excessive force is not transferred to terminal pin 24_a_ of the motor protector.

As stated above, motor protector 24' is received in seat 30_o_ with terminal pin 24_a_ extending through a slot 30_o_1 formed in wall 30_o_2 of the cluster block defining one end of the seat. A second terminal 36, receivable in channel 30_b,_ has a weld tab 36_a_ which is welded to motor protector housing 24_b_ at one end and a female pin connector 36_b_ at an opposite end. A fuse link, either formed integrally with or separately and welded to the terminal parts 36_a,_ 36_b,_ extends therebetween. Although various fuse links can be used, fuse link 26_d'_ of FIGS. 5_b,_ 5_c_ is preferred and is shown in FIGS. 8 and 8_c_ and operates in the same manner as in the FIGS. 1–5 embodiment described above.

The motor protector is mounted on cluster block 30 with terminal pin 24_a_ welded to terminal 32 and is provided to the compressor manufacturer who merely inserts and locks female connectors 34_e,_ 34_c_ in their respective channels 30_a,_ 30_c_ and female connector 34_a_ on terminal 32_d_ in channel 30_d_ and then pushes the cluster block onto lead-through pins 18_a,_ 18_b,_ 18_c_ to complete the mechanical and electrical assembly.

Figure 9:
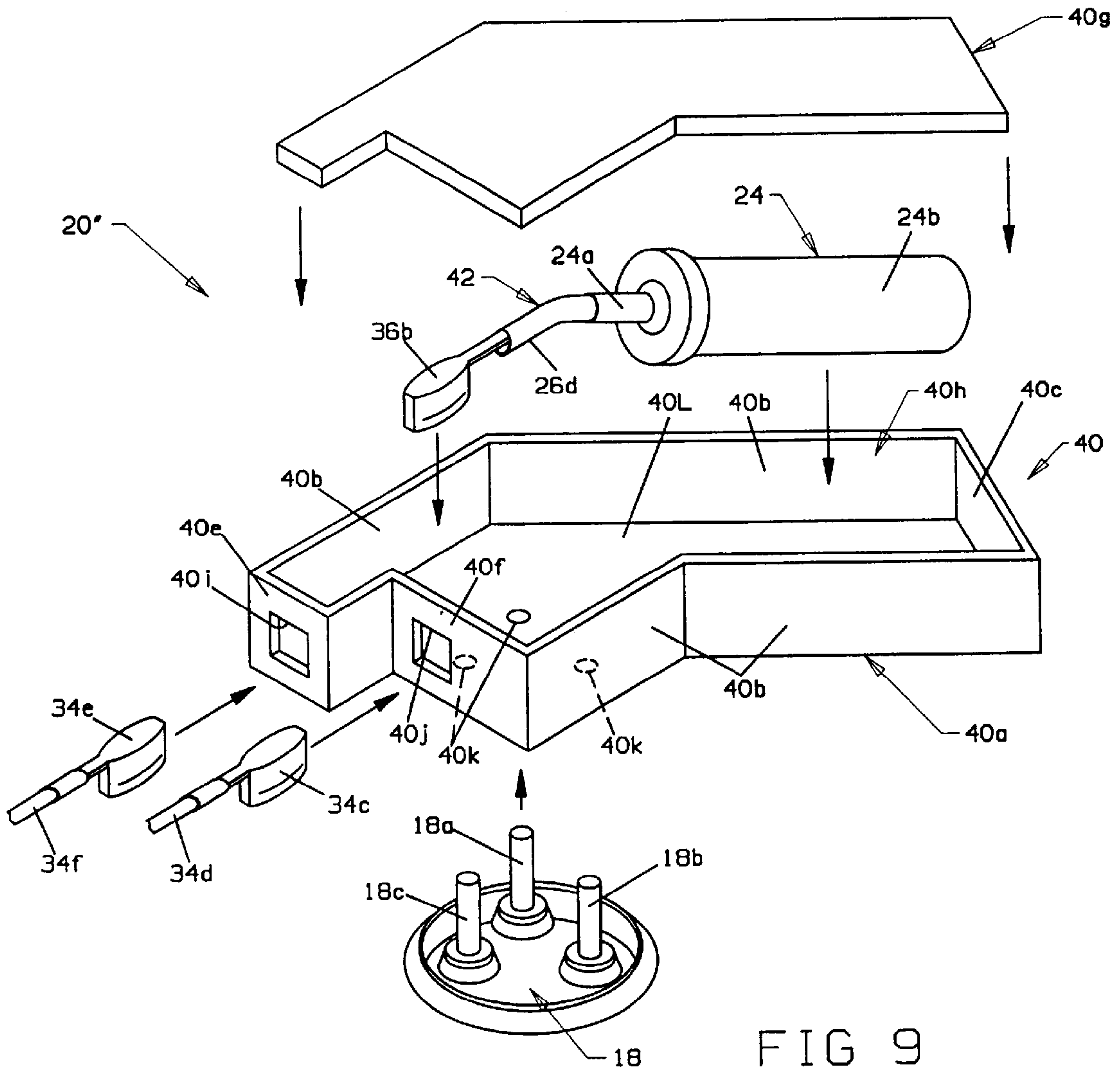
FIG. 9 is an exploded perspective view of a compressor system header along with protector apparatus made in accordance with another embodiment of the invention.

Another embodiment is shown in FIG. 9 in which motor protector unit 20" comprises a two part cluster block 40 having a base portion 40_a_ with upstanding sidewalls 40_b,_ rear wall 40_c_ and front walls 40_e,_ 40_f_ and is closed by a lid 40_g_. Motor protector 24 of any suitable type is received in a recess 40_h_. Cluster block 40 has an irregular shape, as seen in the top plan view in order to conform to the available space in a particular compressor container. It will be realized that the particular shape of cluster block 40 can be modified as required to fit into compressor containers having different available space configurations. Terminal 42 has one outer end welded to terminal pin 24_a_ of motor protector 24 and an opposite end formed with a pin connector 36_b_. Fusible link, 26_d_ being indicated but 26_d'_ or other suitable configuration can be employed, is interposed between connector portion 36_b_ and the end attached to terminal pin 24_a_. A second terminal (not shown) is attached to housing 24_b_ for connection to the common lead of motor 14 through an aperture (not shown) in cluster block 40. Apertures 40_i_ and 40_j_ in end walls 40_e,_ 40_f,_ respectively, provide access for pin connectors 34_e,_ 34_c_. Terminal lead-through pins 18_a,_ 18_b_ and 18_c_ of header 18 are then received through apertures 40_k_ formed in bottom wall 40_l_ of base portion 40_a_.

Figure 10:
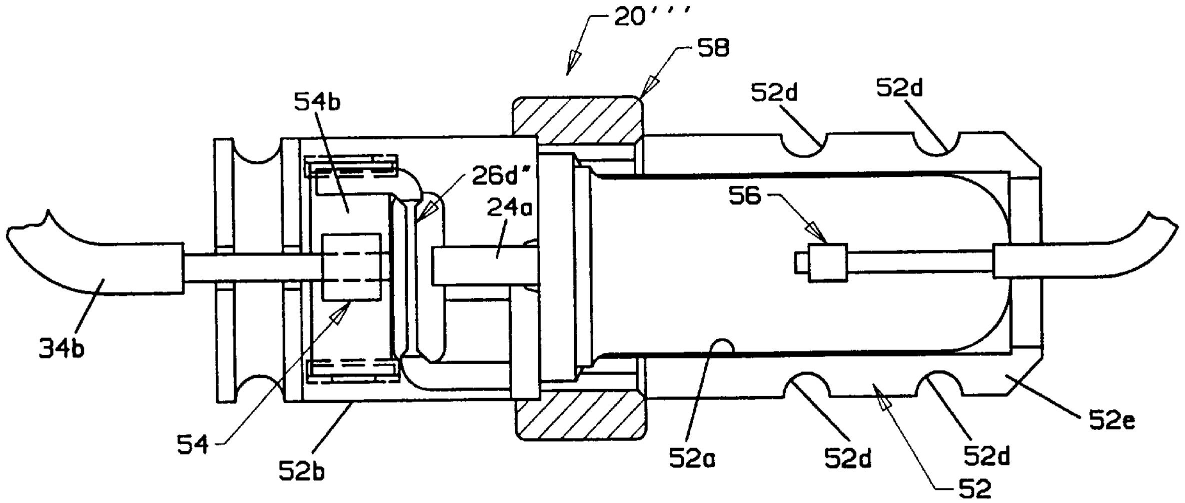
FIG. 10 is a top plan view of protector apparatus made in accordance with yet another embodiment.
Figure 10A:
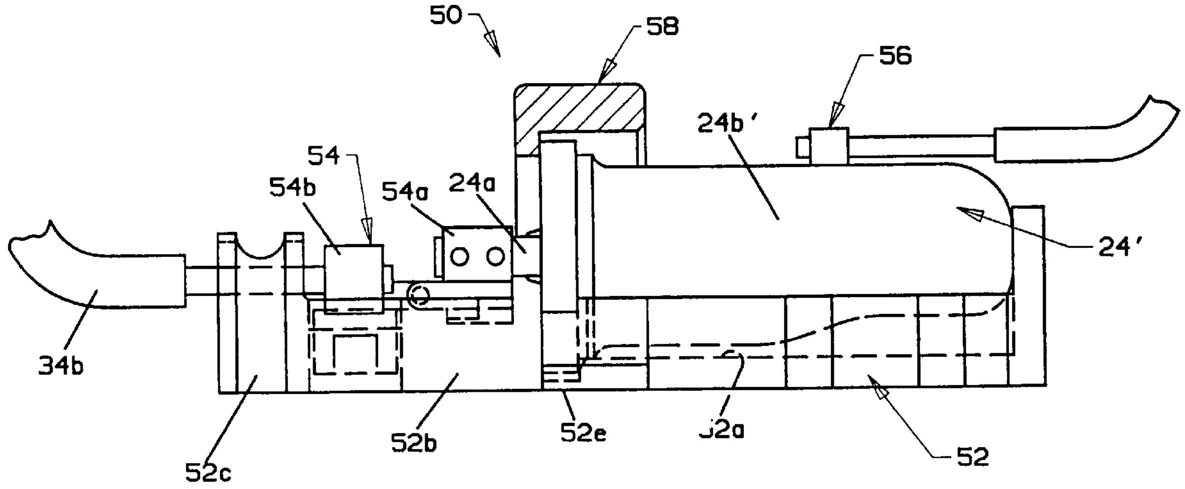
FIG. 10*a* is a front elevational view of the FIG. 10 structure with one component shown in cross section.
Figure 10B:
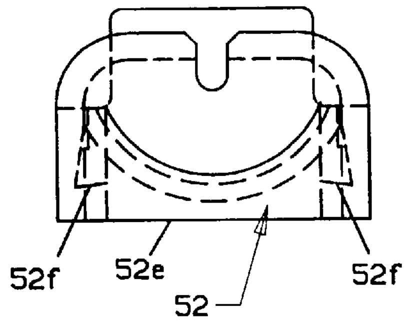
FIG. 10*b* is a left side elevational view of the base 52 of the FIG. 10, 10*a* structure.
Figure 10C:
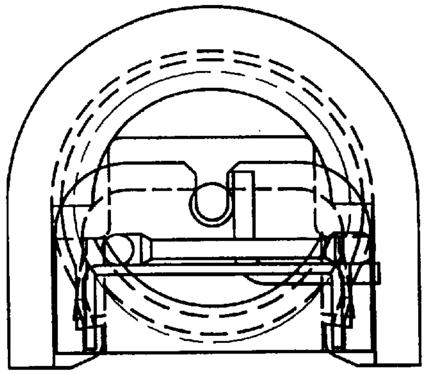
FIG. 10*c* is a left side elevational view of the FIGS. 10, 10*a* structure shown with lead 34*b* removed for purposes of illustration.
Figure 10D:
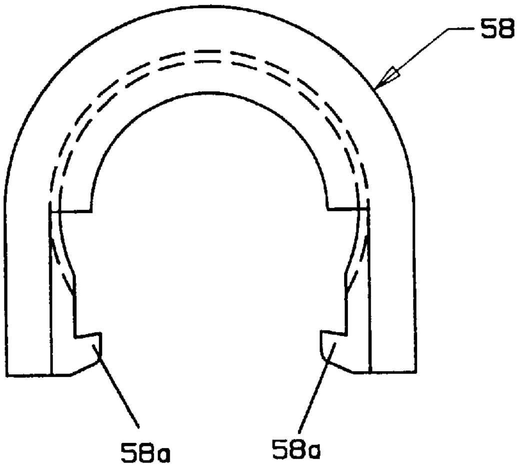
FIG. 10*d* is a side elevational view of member 58 receivable on the base 52 of FIGS. 10, 10*a,* and FIG. 10*e* is a left side elevational view of the combined terminal and fuse link of FIGS. 10, 10*a.*
Figure 10E:
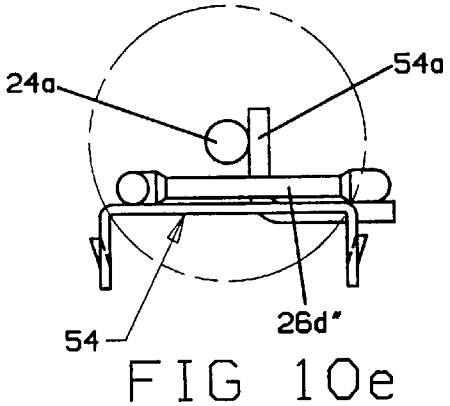

FIGS. 10 and 10_a_—10_e_ shown another embodiment of motor protector unit 20'" particularly adapted to be tied directly onto the stator of motor 14 to maximize thermal conductance to the motor protector apparatus. A base 52 formed of suitable electrically insulative material, such as thermoplastic, has a cradle type motor protector seat 52_a_ and a terminal receiving support 52_b_. A generally semi-circular groove 52_c_ is formed in base 52 for receipt of nylon string or the like used to tie base 52 to the stator winding. Notches 52_d_ located in flange 52_e_ can be used for additional tie down strings. Base 52 is shown formed with a flat bottom wall 52_e_ for receipt on a flattened portion of the winding; however, a concave curved bottom surface could be provided for receipt in a correspondingly configured winding, if desired. A terminal 54 comprises a first portion 54_a_ welded to terminal pin 24_a_ of motor protector 24' and an opposite end 54_b_ which is electrically and physically attached to lead 34_b_ connected to motor 14. Fusible link 24_d",_ formed integrally with or of a separate component, extends between portion 54_a_ and end 54_b_. Fusible link 26_d"_ is shown having a narrow portion with a straight extended length; however, any suitable fusible link can be employed such as fusible links 26_d_ and 26_d'_ described above. A second terminal 56 is welded to motor protector housing 24_b'_ which in turn is connected in conventional manner to lead 58 which extends to pin terminal 18_a_ of header 18. A suitable motor protector such as protector 24' is locked in place by means of an upper member 58 which is generally U-shaped having locking tabs 58_a_ which snap into recesses 52_f_ formed in body 52.

It should be understood that although particular embodiments of the compressor system protection apparatus have been described by way of illustrating the invention, the invention includes all modifications and equivalents of the disclosed embodiments falling within the scope of the appended claims. For example, the shape of the cluster block in any of the embodiments can be irregular to conform to the available space in a particular compressor container as set forth in the FIG. 9 embodiment.

What is claimed:

1. Protection apparatus for compressor systems comprising a hermetically sealed container having an electric motor and a compressor driven by the motor and containing cooling fluid, a header secured to the container for providing a plurality of electrically conductive lead-through pins through a wall of the container, a cluster block disposed in the container for mounting a motor protector and for providing electrical connections between windings of the electric motor and the lead pins, the cluster block having a motor protector seat portion for receiving a motor protector and at least one lead-through pin receiving aperture and an electrical connection means for interconnecting at least one lead-through pin to the electric motor, a motor protector having a thermally responsive switch with first and second terminals, the motor protector received on the motor protector seat portion of the cluster block, an electrical connection means for interconnecting at least one lead-through pin to the electrical motor comprising a combination terminal and fusible link having opposite end portions, one end portion being in electrical connection to the first motor protector terminal externally of the motor protector and the second end portion being in electrical connection with said at least one lead-through pin, said combination terminal and fusible link and said motor protector being exposed to the cooling fluid, and an electrical lead connected between the second motor protector terminal and the electric motor.

2. Protector apparatus according to claim 1 in which the cluster block has a first base member with a bottom wall and upstanding sidewalls and a second member is received on the first base member to enclose the motor protector seat.

3. Protector apparatus according to claim 1 in which the fusible link of the combination terminal and fusible link is formed with a generally semi-circular configuration when viewed from a front plane and extends in a generally V-shaped configuration projected in a second plane perpendicular to the first plane.

4. Protector apparatus according to claim 1 in which the cluster block has top and bottom walls and first and second end portions with the motor protector seat being formed at the second end portion and a plurality of parallel extending channels being formed between the first and second ends, a lead-through pin receiving aperture being formed through the bottom wall in alignment with a channel for each respective lead-through pin, electrical leads having a pin receiving connector received into two respective channels from the first end with the pin receiving connector in alignment with a respective pin receiving aperture and the combination terminal and fusible link received into a third channel from the second end, the combination terminal and fusible link having a pin receiving connector in alignment with a pin receiving aperture in the third channel.

5. Protector apparatus according to claim 4 in which a terminal is connected to the second motor protector terminal and is formed with a spade terminal blade extending into another channel from the second end for reception of a quick connect attached to a lead received in the said another channel from the first end.

6. Protector apparatus according to claim 5 in which the terminal connected to the second motor protector terminal is provided with outwardly extending retention spurs for reception in recesses formed in the another channel.

7. Protection apparatus for compressor systems having a hermetically sealed container with an electric motor and a compressor driven by the motor and cooling fluid therein with a header secured to the container for providing a plurality of electrically conductive lead-through pins through a wall of the container comprising a cluster block disposed in the container with at least one lead-through pin receiving aperture, the cluster block having a motor protector seat portion for receiving a motor protector, a motor protector having a thermally responsive switch with first and second terminals, the motor protector received on the motor protector seat portion of the cluster block, and a combination terminal and fusible link electrically connected to the first motor protector terminal externally of the motor protector, said combination terminal and fusible link and said motor protector being exposed to the cooling fluid.

8. Protector apparatus according to claim 7 in which the cluster block has a first base member formed with string receiving recesses for receipt of elongated members to tie the base member to a static winding of the electric motor, the base member having front and back portions formed with recesses and a second member having tab portions is received over a portion of the base member and motor protector seat with the tab portions scrapped into the recesses.

9. Protector apparatus according to claim 7 in which the cluster block has a first base member with a bottom wall and upstanding sidewalls and a second member is received on the first base member to enclose the motor protector seat.

10. Protector apparatus according to claim 7 in which the fusible link of the combination terminal and fusible link is formed with a generally semi-circular configuration when viewed from a front plane and extends in a generally V-shaped configuration projected in as a second plane perpendicular to the first plane.

11. Protector apparatus according to claim 7 in which the cluster block has top and bottom walls and first and second end portions with the motor protector seat being formed at the second end portion and a plurality of parallel extending channels being formed between the first and second ends, a lead-through pin receiving aperture being formed through the bottom wall in alignment with a channel for each respective lead-through pin, electrical leads having a pin receiving connector received into two respective channels from the first end with the pin receiving connector in alignment with a respective pin receiving aperture and the combination terminal and fusible link received into a third channel from the second end, the combination terminal and fusible link having a pin receiving connector in alignment with a pin receiving aperture in the third channel.

12. Protector apparatus according to claim 11 in which a terminal is connected to the second motor protector terminal and is formed with a spade terminal blade extending into another channel from the second end for reception of a quick connect attached to a lead received in the said another channel from the first end.

13. Protector apparatus according to claim 12 in which the terminal connected to the second motor protector terminal is provided with outwardly extending retention spurs for reception in recesses formed in the another channel.

* * * * *